United States Patent
Hong et al.

(10) Patent No.: US 7,736,786 B2
(45) Date of Patent: Jun. 15, 2010

(54) COMPOSITION FOR FUEL CELL BIPOLAR PLATE

(75) Inventors: Chang Min Hong, Uiwang-si (KR); Sun Ho Park, Uiwang-si (KR); Young Jun Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/164,319

(22) Filed: Jun. 30, 2008

(65) Prior Publication Data

US 2008/0268322 A1 Oct. 30, 2008

Related U.S. Application Data

(63) Continuation-in-part of application No. PCT/KR2006/005813, filed on Dec. 28, 2006.

(51) Int. Cl.
*H01M 2/02* (2006.01)
*H01M 2/00* (2006.01)

(52) U.S. Cl. ....................................................... 429/34

(58) Field of Classification Search .................... 429/34
See application file for complete search history.

(56) References Cited

U.S. PATENT DOCUMENTS

| | | | |
|---|---|---|---|
| 5,191,019 A | 3/1993 | Dahl et al. | |
| 6,242,127 B1 * | 6/2001 | Paik et al. | 429/145 |
| 6,248,262 B1 * | 6/2001 | Kubotera et al. | 252/511 |
| 6,723,400 B1 | 4/2004 | Ishio et al. | |
| 2004/0229993 A1 * | 11/2004 | Huang et al. | 524/495 |
| 2006/0084750 A1 * | 4/2006 | Huang et al. | 524/495 |

FOREIGN PATENT DOCUMENTS

| | | | |
|---|---|---|---|
| JP | 52-12240 | | 1/1977 |
| JP | 02281078 A | * | 11/1990 |
| JP | 45-3368 | | 6/1992 |
| JP | 08253679 A | | 10/1996 |
| KR | 20030041004 A | | 5/2003 |

OTHER PUBLICATIONS

International Search Report for corresponding International Application No. PCT/KR2006/005813, dated Apr. 13, 2007.

* cited by examiner

*Primary Examiner*—Jerry Lorengo
*Assistant Examiner*—Eli Mekhlin
(74) *Attorney, Agent, or Firm*—Summa, Additon & Ashe, P.A.

(57) ABSTRACT

Disclosed herein is a composition suitable for use in the production of a fuel cell bipolar plate having improved electrical conductivity and mechanical strength. The composition for a fuel cell bipolar plate can include about 100 parts by weight of a basic resin composition including about 10 to about 50 parts by weight of polyphenylene sulfide as a thermoplastic resin and about 50 to 90 parts by weight of a conductive filler and about 0.01 to about 30 parts by weight of a disulfide compound. The composition can improve impregnation of the conductive filler into the thermoplastic resin.

16 Claims, 1 Drawing Sheet

COMPOSITION FOR FUEL CELL BIPOLAR PLATE

CROSS-REFERENCE TO RELATED APPLICATIONS

This application is a continuation-in-part application of PCT Application No. PCT/KR2006/005813, filed Dec. 28, 2006, pending, which designates the U.S. and which is hereby incorporated by reference in its entirety, and claims priority therefrom under 35 USC Section 120. This application also claims priority under 35 USC Section 119 from Korean Patent Application No. 10-2005-0135201, filed Dec. 30, 2005, and Korean Patent Application No. 10-2006-0001266, filed Jan. 5, 2006, both of which are also hereby incorporated by reference in their entirety.

FIELD OF THE INVENTION

The present invention relates to a composition for a fuel cell bipolar plate.

BACKGROUND OF THE INVENTION

Fuel cells directly convert chemical energy of a fuel gas (i.e., hydrogen ($H_2$)) into electrical energy.

Fuel cells are capable of generating direct current. Fuel cells continuously generate electricity using fuel and air supplied from the outside, in contrast with conventional electric cells.

In particular, fuel cells are an electric generator which directly converts chemical energy of a fuel gas into electrical energy via electrochemical reaction using hydrogen ($H_2$) contained in a hydrocarbon compound, such as methanol or natural gas, and oxygen ($O_2$) in air, as fuel gases.

Fuel cells are a clean energy converter with high efficiency that use both electricity, generated by electrochemical reaction of a fuel gas with an oxidizing gas without any combustion, and heat as a by-product thereof.

Based on the electrolyte used, fuel cells are divided into phosphoric acid fuel cells operating at a temperature of about 150 to 200° C., polymer electrolyte fuel cells and alkaline fuel cells operating at a temperature range of about room temperature to 100° C. or less, molten carbonate fuel cells operating at a high temperature of about 600 to 700° C., and solid oxide fuel cells operating at a high temperature of about 1,000° C. or more.

These fuel cells have similar operation mechanisms, but they are different from each other in terms of fuel type, operation temperature, and catalyst and electrolyte used.

FIG. 1 is a sectional view illustrating an electricity generation mechanism in a unit cell of a fuel cell.

As shown in FIG. 1, a unit cell of the fuel cell includes of a drying layer 16 made from a Nafion solution, Nafion films 15, 15' arranged on the opposite sides of the drying layer 16, platinum/carbon catalyst layers 14, 14' acting as electrodes, teflon-treated carbon cloths 13, 13', bipolar plates 12, 12' and metallic endplates 11, 11', which are laminated in this order.

FIG. 2 is a plan view illustrating the bipolar plates 12, 12' in FIG. 1.

The electricity generation mechanism of the fuel cell will be described with reference to FIGS. 1 and 2.

Hydrogen ($H_2$) gas, acting as a fuel gas, which is supplied from a gas flow channel C in one bipolar plate 12, reacts with a platinum/carbon catalyst of a positive electrode 14 and releases electrons to form hydrogen ions.

The hydrogen ions pass through polymer electrolytic films 15, 15' and the Nafion drying layer 16 to the opposite negative electrode 14'.

Oxygen ($O_2$) gas supplied from a gas flow channel C' in another bipolar plate 12' is reduced by the electrons, which are introduced into the negative electrode 14' via an external circuit, thereby forming an oxygen ion. The oxygen ion ($O^{2-}$) reacts with the hydrogen ions ($H^+$) in the negative electrode 14' to generate water ($H_2O$) on the surface of the negative electrode 14'.

This water is discharged together with remaining oxygen gas into an exit of the gas flow channel C'. At this time, electrons generated by the catalyst reaction move through the external circuit to generate electricity.

The performance of the bipolar plates 12, 12' serving as the gas flow channels C, C' has a great influence on the generation system of fuel cells. The bipolar plates 12, 12' must have superiority in various characteristics, such as electrical conductivity, mechanical strength, corrosion resistance and thermal stability.

In conventional cases, metallic bipolar plates, carbon bipolar plates, and carbon composite bipolar plates were commonly used as the bipolar plates.

The metallic bipolar plates have the disadvantage of poor corrosion resistance. Disadvantages of the carbon bipolar plates are high production costs and low mechanical strength. The carbon composite bipolar plates have a problem with low electrical conductivity.

Thermoplastic resin-based bipolar plates were developed in an attempt to solve the problems associated with conventional bipolar plates. Thermoplastic resin-based bipolar plates are produced by filling a thermoplastic resin matrix with a conductive filler to obtain electrical conductivity.

Thermoplastic resin-based bipolar plates use a polymeric thermoplastic resin as a matrix, and thus can be mass produced using injection molding techniques.

Thermoplastic resin-based bipolar plates continue to be the subject of active research and development efforts as an alternative to conventional bipolar plates because they have high corrosion resistance and mechanical strength, due to the inherent characteristics of the polymers used.

A thermoplastic resin-based bipolar plate can be produced by impregnating a conductive filler into a molten thermoplastic resin. The thermoplastic resin has inherently high viscosity, thus making it impossible to obtain a desired degree of impregnation of a conductive filler into the resin (Specifically, a theoretical value of maximum impregnation degree is 67% by volume, but an experimental value thereof is not more than 40% by volume).

When a bipolar plate is produced using a thermoplastic resin having a low degree of impregnation by a conductive filler, the resultant bipolar plate has low conductivity, thus limiting its commercial feasibility. Typically, for a bipolar plate to be commercially feasible, the bipolar plate should have an electrical conductivity of 50 S/cm or more.

In addition, a bipolar plate prepared with a low degree of impregnation can have a low flexural strength due to the inherent flowability of thermoplastic resins, thus making it difficult to obtain a desired mechanical strength.

SUMMARY OF THE INVENTION

In accordance with one aspect of the present invention, there is provided a composition for a fuel cell bipolar plate. The composition of the invention can comprise: about 100 parts by weight of a basic resin composition comprising polyphenylene sulfide as a thermoplastic resin and a conductive filler; and about 0.01 to about 30 parts by weight of a disulfide compound.

In exemplary embodiments of the invention the basic resin composition can include about 10 to about 50 parts by weight of polyphenylene sulfide and about 50 to about 90 parts by weight of the conductive filler. In other exemplary embodiments of the invention, the basic resin composition can include about 10 to about 30 parts by weight of polyphenylene sulfide and about 70 to about 90 parts by weight of the conductive filler.

In the composition for a fuel cell bipolar plate according to an exemplary embodiment of the present invention, use of even a small amount of a disulfide compound can greatly increase the degree of impregnation of a conductive filler into a polyphenylene sulfide resin. This can enable production of fuel cell bipolar plates with conductivity and mechanical strength suitable for commercialization.

The present invention also provides fuel cell bipolar plates. The fuel cell bipolar plate can be formed of a composition comprising about 100 parts by weight of a basic resin composition comprising polyphenylene sulfide as a thermoplastic resin and a conductive filler; and about 0.01 to about 30 parts by weight of a disulfide compound. Other exemplary embodiments of the invention can include a fuel cell bipolar plate including polyphenylene sulfide and a conductive filler and having an electrical conductivity of at least about 50 S/cm, for example at least about 75 S/cm, at least about 100 S/cm, at least about 125 S/cm, and at least about 150 S/cm.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
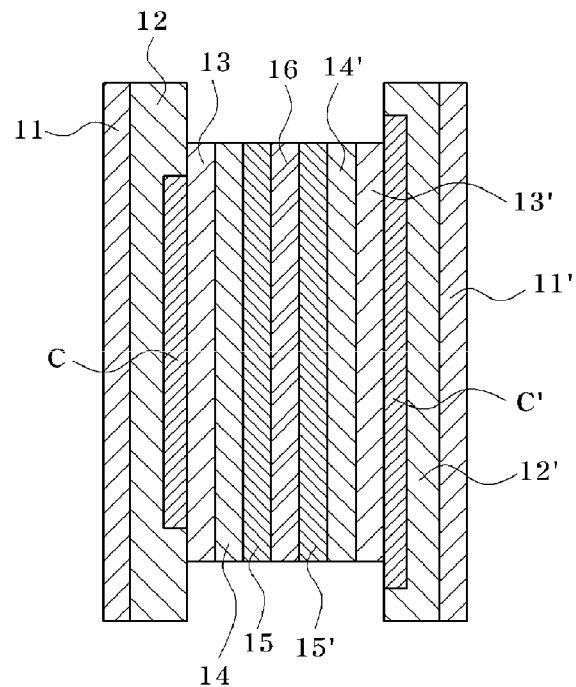
FIG. 1 is a sectional view illustrating an electricity generation mechanism in a unit cell of a fuel cell.
Figure 2:
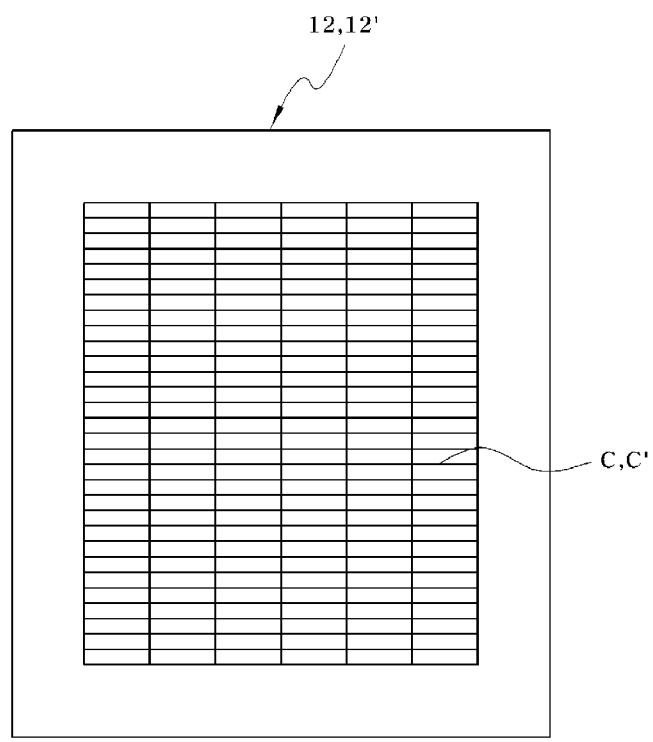
FIG. 2 is a plan view illustrating bipolar plates 12, 12' of the unit cell of FIG. 1.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to an exemplary embodiment of the present invention, the fuel cell bipolar plate composition comprises about 100 parts by weight of a basic resin composition comprising polyphenylene sulfide as a thermoplastic resin and a conductive filler and about 0.01 to about 30 parts by weight of a disulfide compound.

Generally, extrusion is used to prepare a composition from a polymeric resin.

The extrusion is carried out by injecting materials into a hopper, melting and mixing the injected materials in a twin screw extruder to pelletize the mixture, and injection molding the pellet to obtain an article in the form of a plate.

The injection of materials into a hopper is performed in one or more steps.

In the present invention, polyphenylene sulfide (PPS) as a thermoplastic resin, disulfide and a conductive filler can be simultaneously injected into a primary hopper, followed by melting and mixing. Alternatively, polyphenylene sulfide (PPS) and a conductive filler may be injected into a primary hopper, followed by melting. Thereafter, disulfide can be injected into a secondary or tertiary hopper.

When the polyphenylene sulfide resin is mixed with disulfide, the mixture has a low molecular weight and viscosity, and thus exhibits improved flowability.

The conductive filler may be separately injected into primary, secondary and tertiary hoppers, or simultaneously injected into a primary hopper.

According to the present invention, the polyphenylene sulfide resin can be a polymer comprising a repeat unit, where an aromatic ring is bound to a sulfur (s) atom, represented by Formula 1 below:

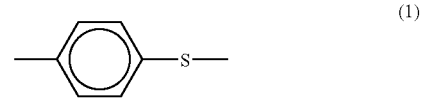

The polyphenylene sulfide resin can comprise about 70 mol % or more of the repeat unit of Formula 1.

When a polymer contains the repeat unit in an amount of about 70 mol % or more, the polymer can exhibit superior crystallinity, which is one of the inherent characteristics of crystalline polymers, high heat resistance, chemical resistance and strength.

The polyphenylene sulfide resin may be a linear, branched or cross-linked polyphenylene sulfide resin type. Any polyphenylene sulfide resin type may be used without particular limitation.

Japanese Examined Patent Publication Sho. 45-3368 discloses a typical method for preparing a cross-linked type of polyphenylene sulfide resin. Japanese Examined Patent Publication Sho. 52-12240 discloses a typical method for preparing a linear type of polyphenylene sulfide resin.

The polyphenylene sulfide resin of the present invention may comprise, in addition to the repeat unit of Formula 1, a unit selected from: a meta bond represented by Structure 1 below;

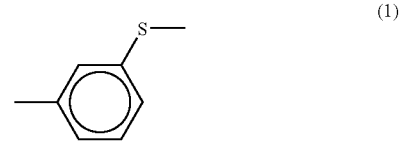

an ether bond represented by the Structure 2 below;

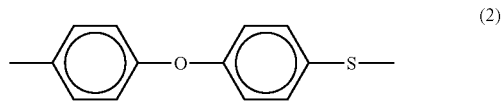

a sulfone bond represented by the Structure 3 below;

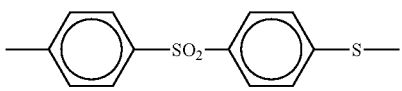

a sulfide ketone bond represented by Structure 4 below;

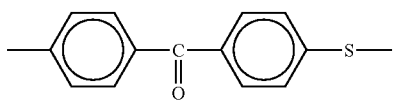

a biphenyl bond represented by Structure 5 below;

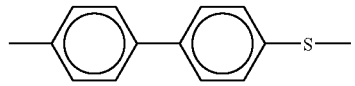

a substituted phenyl sulfide bond represented by Structure 6 below;

wherein R is C1-C20 alkyl, nitro, phenyl or C1-C20 alkoxy group
a phenyl disulfide bond represented by Structure 7 below; and

a naphthyl bond represented by Structure 8 below

The content of the monomer selected from Structures 1 to 8 is less than about 50 mol %, for example less than about 30 mol %.

The polyphenylene sulfide resin has a melt index (MI) of about 10 g/10 min to about 3,000 g/10 min (MI range 10~3000 g/10 min). The melt index (MI) is measured in accordance with ASTM D 1238 under conditions of 316° C., 2.16 kg.

In the present invention, the polyphenylene sulfide resin is used as a thermoplastic resin.

Any polymer resin may be used without particular limitation so long as it comprises a monomer in which an aromatic ring is bound to a sulfur (s) atom. For example, polyphenylene sulfide ketone and polyphenylene sulfide sulfone may be used in the present invention.

Advantageously, the polyphenylene sulfide resin of Formula 1 includes a monomer with a structure in which sulfur is introduced in a para position of the aromatic ring.

The aromatic ring may contain a substituent. The copolymer may be a random copolymer, a block copolymer, a mixture of a random copolymer and a block copolymer, or a mixture of one or both of a random copolymer and a block copolymer with a homopolymer.

Polyphenylene sulfide resins are inherently very brittle, and generally can be modified by modifiers or are filled with a filler. The filler used herein includes a conductive filler.

The larger the content of modifier or filler contained in the resin, the higher the mechanical strength of the resin.

The polyphenylene sulfide resin is used to produce a bipolar plate. Accordingly, to satisfy conductivity and mechanical strength requirements to commercialize fuel cell bipolar plates, a conductive material is used as a filler.

The conductive filler comprises at least one selected from carbon black, a carbon fiber, graphite and a metallic filler. The conductive filler may be used singly or as a mixture of two or more types thereof.

The disulfide compound contained in the composition of the present invention is used to improve the flowability of polyphenylene sulfide and lower the viscosity thereof. The disulfide compound comprises at least one selected from benzothiazole disulfide, tetrabenzylthiuram disulfide, tetramethylthiuram disulfide, tetraethylthiuram disulfide, isopropylthiuram disulfide, phenylethylthiuram disulfide, 2,2'-benzothiazolyl disulfide, and the like, and combinations thereof.

As described above, during injection molding, the disulfide compound lowers the viscosity of the polyphenylene sulfide resin, thus improving flowability thereof. As a result, the degree of impregnation of the conductive filler into the resin can be improved.

The disulfide compound further alleviates hardening of the resin, thus enhancing processability.

As the content of the conductive filler to be impregnated into the resin is increased, the conductivity and mechanical strength of the produced fuel cell bipolar plate tends to increase, which is apparent to those skilled in the art.

The disulfide compound is used in an amount of about 0.01 to about 30 parts by weight, based on about 100 parts by weight of a basic resin composition comprising polyphenylene sulfide as a thermoplastic resin and a conductive filler.

The content of the disulfide compound can be, for example, about 0.01 to about 10 parts by weight, and as another example about 1 to about 7 parts by weight.

The composition of the present invention may further comprise one or more types of a thermoplastic resin and/or a thermosetting resin so long as the inclusion of the resin is not detrimental to original aspects of the present invention.

Exemplary thermoplastic resins that may be used in the present invention can include without limitation at least one selected from polystyrene (PS), an acrylonitrile butadiene styrene (ABS) copolymer, a styrene acrylonitrile (SAN) copolymer, rubber modified polystyrene (HIPS: high impact polystyrene), an acrylonitrile styrene acrylate (ASA) copolymer, polycarbonate (PC), polyolefins, such as polyethylene (PE) and polypropylene (PP), polyesters, such as polyethylene terephthalate (PET) and polybutylene terephthalate (PBT), polyvinyl chloride (PVC), polymethyl methacrylate (PMMA), polyamide (PA), and the like, as well as a copolymer and/or mixture thereof.

The resin composition of the present invention may further comprise a general additive selected from auxiliary flame retardants, lubricants, release agents, nucleating agents, antistatic agents, stabilizers, modifiers, inorganic additives, dyes and pigments, and the like, and combinations thereof.

An inorganic additive can be present in an amount of about 0 to about 60 parts by weight, for example about 1 to about 40 parts by weight, based on about 100 parts by weight of the basic resin composition.

Hereinafter, the production of a fuel cell bipolar plate using the composition according to exemplary embodiments of the present invention and exhibiting high conductivity and mechanical strength will be demonstrated from the following Examples and Comparative Examples. Although not specifically mentioned herein, it will be apparent to those skilled in the art that detailed contents can be derived from the following description.

The present invention will be better understood from the following examples. However, these examples are not to be construed as limiting the scope of the invention.

EXAMPLES

Example 1

(A) 30 parts by weight of polyphenylene sulfide, (B) 20 parts by weight of a carbon black as a conductive filler, and (C) 50 parts by weight of graphite are mixed to prepare a basic resin composition.

2 parts by weight of 2,2'-benzothiazolyl disulfide as a disulfide compound is mixed with a total of 100 parts by weight of the basic resin composition, to prepare a final composition for a fuel cell bipolar plate.

The disulfide compound is introduced together with polyphenylene sulfide into a primary hopper. The conductive filler is sequentially introduced into primary, secondary, and tertiary hoppers.

The polyphenylene sulfide used herein is PR-11® (available from Chevron Phillips Chemical (CPC) Company, LLC. US) having a melt flow index (MFI) of 100 g/10 min to 2,000 g/10 min under conditions of 316° C. and 1,270 g to obtain the desired degree of impregnation.

The carbon black used herein as a conductive filler is Kenjenblack 300J® (available from Akzo Nobel, Corp.). Alternatively, Ketjenblack 300J® may be used.

The graphite used herein as a conductive filler is Expanded graphite® (available from SGL Technologies GmbH, Germany).

The 2,2'-benzothiazolyl disulfide used herein as polyphenylene sulfide is available from DC Chemical Co., Ltd.

Example 2

A composition for a fuel cell bipolar plate is produced in the same manner as in Example 1, except that (A) 20 parts by weight of polyphenylene sulfide, (B) 20 parts by weight of a carbon black as a conductive filler and (C) 60 parts by weight of graphite are mixed with 3 parts by weight of 2,2'-benzothiazolyl disulfide as a disulfide compound, based on a total of 100 parts by weight of (A), (B) and (C).

Example 3

A composition for a fuel cell bipolar plate is prepared in the same manner as in Example 1, except that (A) 30 parts by weight of polyphenylene sulfide and (C) 70 parts by weight of graphite are mixed with 2 parts by weight of 2,2'-benzothiazolyl disulfide as a disulfide compound, based on a total of 100 parts by weight of (A) and (C).

Example 4

A composition for a fuel cell bipolar plate is prepared in the same manner as in Example 1, except that (A) 15 parts by weight of polyphenylene sulfide and (C) 85 parts by weight of graphite are mixed with 5 parts by weight of 2,2'-benzothiazolyl disulfide as a disulfide compound, based on a total of 100 parts by weight of (A) and (C).

Comparative Example 1

A composition for a fuel cell bipolar plate is prepared in the same manner as in Example 1, except that (A) 80 parts by weight of polyphenylene sulfide and (B) 20 parts by weight of a carbon black as a conductive filler only are mixed with each other.

Comparative Example 2

A composition for a fuel cell bipolar plate is prepared in the same manner as in Example 1, except that (A) 40 parts by weight of polyphenylene sulfide and (C) 60 parts by weight of graphite only are mixed with each other.

The content of conductive filler each used in Comparative Examples 1 and 2 is the maximum amount that can be impregnated into the polyphenylene sulfide. The content of conductive filler each used in Examples 1 to 4 is larger than that of conductive filler used in each of the Comparative Examples.

The conductivity of the bipolar plate produced with each composition prepared in the Examples and Comparative Examples is measured in accordance with ASTM D257. The flexural strength of the bipolar plate is measured in accordance with ASTM D790. The results are shown in Table 1.

TABLE 1

|  | Ex. 1 | Ex. 2 | Ex. 3 | Ex. 4 | Comp. Ex. 1 | Comp. Ex. 2 |
| --- | --- | --- | --- | --- | --- | --- |
| Electrical conductivity (S/cm) | 50 | 100 | 50 | 150 | 1 | 10 |
| Flexural strength (MPa) | 200 | 100 | 130 | 95 | 150 | 180 |

The conductivity and flexural strength required to commercialize bipolar plates generally used in fuel cells are 50 S/cm or more and 60 Mpa or more, respectively.

The fuel cell bipolar plates of Comparative Examples 1 and 2 exhibit relatively good flexural strength, but relatively low conductivity of 50 S/cm or less, despite the use of the conductive filler in the maximum amount.

On the other hand, the fuel cell bipolar plates of Examples 1 to 4 satisfy the electrical conductivity required for commercial availability, despite the use of the disulfide compound in a small amount.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A composition for a fuel cell bipolar plate comprising:
about 100 parts by weight of a basic resin composition comprising polyphenylene sulfide as a thermoplastic resin and a conductive filler; and
about 0.01 to about 30 parts by weight of a disulfide compound, wherein the disulfide compound lowers the viscosity of the polyphenylene sulfide resin and increases the amount of conductive filler that can be added to the basic resin as compared to the same basic resin without the disulfide compound, and wherein the disulfide compound is 2,2'-benzothiazolyl disulfide.

2. The composition for a fuel cell bipolar plate according to claim 1, wherein the composition comprises the disulfide compound in an amount of about 0.01 to about 10 parts by weight, based on about 100 parts by weight of the basic resin composition.

3. The composition for a fuel cell bipolar plate according to claim 1, wherein the composition comprises the disulfide compound in an amount of about 1 to about 7 parts by weight, based on about 100 parts by weight of the basic resin composition.

4. The composition for a fuel cell bipolar plate according to claim 1, wherein the basic resin composition comprises about 10 to about 50 parts by weight of polyphenylene sulfide and about 50 to about 90 parts by weight of the conductive filler.

5. The composition for a fuel cell bipolar plate according to claim 4, wherein the basic resin composition comprises about 10 to about 30 parts by weight of polyphenylene sulfide and about 70 to about 90 parts by weight of the conductive filler.

6. The composition for a fuel cell bipolar plate according to claim 1, wherein the conductive filler comprises at least one filler selected from carbon black, a carbon fiber, graphite, a metallic filler, or a combination thereof.

7. A fuel cell bipolar plate formed of a composition according to claim 1.

8. The fuel cell bipolar plate according to claim 7 having an electrical conductivity as measured in accordance with ASTM D257 of at least about 50 S/cm.

9. The fuel cell bipolar plate according to claim 8, having an electrical conductivity of at least about 75 S/cm.

10. The fuel cell bipolar plate according to claim 9, having an electrical conductivity of at least about 100 S/cm.

11. A fuel cell bipolar plate formed of a composition comprising:
about 100 parts by weight of a basic resin composition comprising about 10 to about 30 parts by weight of polyphenylene sulfide and about 70 to about 90 parts by weight of a conductive filler; and
about 0.01 to about 30 parts by weight of 2,2'-benzothiazolyl disulfide.

12. A method for producing a composition useful for a fuel cell bipolar plate using a twin-screw extruder, comprising:
introducing polyphenylene sulfide, a disulfide compound and a conductive filler into a primary hopper of the extruder, wherein the disulfide compound lowers the viscosity of the polyphenylene sulfide resin and increases the amount of conductive filler that can be added to the basic resin as compared to the same basic resin without the disulfide compound, wherein the introducing step comprises introducing about 100 parts by weight of a basic resin composition comprising said polyphenylene sulfide as a thermoplastic resin and said conductive filler; and about 0.01 to about 30 parts by weight of said disulfide compound, and wherein the basic resin composition comprises about 10 to about 30 parts by weight of polyphenylene sulfide and about 70 to about 90 parts by weight of the conductive filler; and
melting and mixing the polyphenylene sulfide, disulfide compound and conductive filler,
wherein the disulfide compound is 2,2'-benzothiazolyl disulfide.

13. The method according to claim 12, further comprising the step of introducing said conductive filler in secondary and tertiary hoppers of the extruder.

14. The method according to claim 12, further comprising the step of extruding the polyphenylene sulfide, disulfide compound and conductive filler.

15. A method for producing a composition useful for a fuel cell bipolar plate using a twin-screw extruder, comprising:
introducing polyphenylene sulfide into a primary hopper,
separately introducing a disulfide compound into at least one hopper selected from secondary and tertiary hoppers, and
introducing a conductive filler into at least one hopper selected from said primary, secondary and tertiary hoppers,
wherein the disulfide compound lowers the viscosity of the polyphenylene sulfide resin and increases the amount of conductive filler that can be added to the basic resin as compared to the same basic resin without the disulfide compound and wherein the disulfide compound is 2,2'-benzothiazolyl disulfide.

16. The method according to claim 15, further comprising the step of extruding the polyphenylene sulfide, disulfide compound and conductive filler.

* * * * *

UNITED STATES PATENT AND TRADEMARK OFFICE
CERTIFICATE OF CORRECTION

| | | |
|---|---|---|
| PATENT NO. | : 7,736,786 B2 | Page 1 of 1 |
| APPLICATION NO. | : 12/164319 | |
| DATED | : June 15, 2010 | |
| INVENTOR(S) | : Chang Min Hong, Sun Ho Park and Young Jun Lee | |

It is certified that error appears in the above-identified patent and that said Letters Patent is hereby corrected as shown below:

Omitted from the Title Page:

Foreign Application Priority Data

Dec. 30, 2005   (KR).............................. 10-2005-135201
Jan. 5, 2006    (KR).............................. 10-2006-0001266

Signed and Sealed this

Fifth Day of October, 2010

David J. Kappos
*Director of the United States Patent and Trademark Office*